(12) United States Patent
Reed et al.

(10) Patent No.: US 9,686,026 B1
(45) Date of Patent: Jun. 20, 2017

(54) SYSTEMS AND METHODS TO ENCODE MOBILE DEVICE TESTING RESULTS IN MACHINE-READABLE SYMBOLS DISPLAYABLE BY A MOBILE DEVICE

(71) Applicant: Mobile Experience, Inc., Renton, WA (US)

(72) Inventors: David K. Reed, Sammamish, WA (US); Mark Knasiak, Renton, WA (US); Nicholas J. Dollinger, New Orleans, LA (US); Philip E. Brown, Redmond, WA (US)

(73) Assignee: MOBILE EXPERIENCE, INC., Renton, WA (US)

( * ) Notice: Subject to any disclaimer, the term of this patent is extended or adjusted under 35 U.S.C. 154(b) by 0 days.

(21) Appl. No.: 15/427,946

(22) Filed: Feb. 8, 2017

Related U.S. Application Data

(60) Provisional application No. 62/447,280, filed on Jan. 17, 2017.

(51) Int. Cl.
| | | |
|---|---|---|
| *H04B 17/00* | (2015.01) | |
| *H04B 17/309* | (2015.01) | |
| *H04W 24/02* | (2009.01) | |
| *H04L 12/24* | (2006.01) | |
| *G06K 19/06* | (2006.01) | |
| *H04M 1/02* | (2006.01) | |

(52) U.S. Cl.
CPC ..... *H04B 17/309* (2015.01); *G06K 19/06037* (2013.01); *H04L 41/22* (2013.01); *H04W 24/02* (2013.01); *H04M 1/0202* (2013.01)

(58) Field of Classification Search
CPC ............... G06K 7/14; G06K 7/10851; G06K 2207/1011; G06K 19/06028; G06K 7/10702; G06K 7/1417; G06K 1/121; G06K 2019/06262; G06K 7/10554; G06K 7/10732; G06K 7/1465; G06K 7/1486; G06K 9/00221; G06K 9/228; G06K 9/6293; G06K 17/00
USPC ........................................................ 455/67.1
See application file for complete search history.

(56) References Cited

U.S. PATENT DOCUMENTS

| | | | | |
|---|---|---|---|---|
| 2007/0295817 | A1* | 12/2007 | Massieu ............. | G06K 7/10702 235/462.23 |
| 2009/0212111 | A1* | 8/2009 | Krichi .................... | G06K 7/14 235/462.11 |
| 2011/0257971 | A1* | 10/2011 | Morrison ........... | G06K 9/00221 704/233 |

* cited by examiner

*Primary Examiner* — Ajibola Akinyemi
(74) *Attorney, Agent, or Firm* — Seed IP Law Group LLP; Jeffrey Danley

(57) ABSTRACT

A system and method to perform one or more tests related to the service quality and performance capabilities provided by a network, and to display and collect the test results. The tests may be initiated by a mobile device that may transmit testing requests to a network server. The mobile device may also store various information or data related to the testing request. The server collects various data in response to the test request that is used to generate a machine-readable symbol that may be visually rendered on a display of the mobile device. A test and measurement system may be used to capture and decode the machine-readable symbol. The test and measurement system may store the decoded information in one or more servers.

30 Claims, 9 Drawing Sheets

SYSTEMS AND METHODS TO ENCODE MOBILE DEVICE TESTING RESULTS IN MACHINE-READABLE SYMBOLS DISPLAYABLE BY A MOBILE DEVICE

This application claims the benefit under 35 U.S.C. §119 (e) of U.S. Provisional Patent Application No. 62/447,280, entitled "SYSTEMS AND METHODS TO ENCODE MOBILE DEVICE TESTING RESULTS IN MACHINE-READABLE SYMBOLS DISPLAYABLE BY A MOBILE DEVICE," filed Jan. 17, 2017, which is incorporated herein by reference in its entirety.

FIELD

This disclosure generally relates to automated or interactive monitoring and testing of wireless communications-based mobile devices (hereinafter "mobile devices"), and more particularly to generating, displaying, and capturing testing and monitoring data.

BACKGROUND

Description of the Related Art

Hardware manufacturers or designers are releasing new mobile devices at a faster rate, with higher complexity, and with a wider variety of functionality across the mobile device offerings. Wireless communications service providers or carriers and data service providers (e.g., cellular communications service providers or carriers) typically provide a variety of mobile devices or services related to such mobile devices (e.g., smart phones, tablet computers) in a variety of locations, conditions and environments. Such variety, coupled with the increasing complexity and variety of mobile devices and the expanding input and output capabilities of such mobile devices, may lead to unforeseen or even undesirable behavior. Enabling hardware manufacturers and/or service providers (collectively, "clients") to locally or remotely monitor and interactively test mobile devices may provide those clients with opportunities to identify and reproduce such behavior, for instance aberrant behavior.

Capturing all output of one or more representative mobile devices, while monitoring user input to the devices or even reproducing user-reported actions to attempt to reproduce the undesirable behavior, may be useful to a number of different entities—to the mobile device manufacturer or designer; to a wireless service provider of the end user; to a provider of the application that is reportedly in use when the undesirable audio interference occurs; to end users of the mobile device; or other entity. Additionally, the ability to remotely perform such monitored interactions with the mobile device may provide improved results, by allowing those results to be obtained for multiple mobile devices in a variety of locations, conditions and environments (such as those that may resemble those in which the undesirable behavior was observed) while allowing a client interested in such results to remain in a single preferred location. Moreover, allowing for the data from various mobile devices being tested and monitored to be transmitted to and analyzed by a central server or database may provide the clients with the ability to better detect and diagnose issues with specific applications, issues with specific types of mobile device, or issues with the communications network in general.

New approaches are therefore desirable that test various activities related to mobile devices while allowing for the quick and efficient transfer of test-related data to the clients or other parties.

BRIEF SUMMARY

A method for use in testing mobile services provided to at least a first communications device via a mobile services carrier network may be summarized as including storing state information that represents at least one state of at least one of the first communications device or the mobile services carrier network; storing test result information that represents a respective test result for each of a number of tests executed by the first communications device via the mobile services carrier network; storing a number of parameter values that represent parameter values for a number of parameters of each of the number of tests executed by the first communications device via the mobile services carrier network; and generating a machine-readable symbol representation, via at least one processor, that encodes in a relative spacing between a plurality of marks and spaces between the marks the stored state information, the stored test result information, and the stored number of parameter values, for each of the number of tests executed by the first communications device via the mobile services carrier network. Generating a machine-readable symbol representation may include generating an electronic representation of a two-dimensional machine-readable symbol that is selectively optically displayable via a respective display screen of at least the first communications device. Generating a machine-readable symbol representation may include generating a visual representation of a two-dimensional machine-readable symbol by a respective display screen of at least the first communications device.

The method may further include collecting the state information via a respective processor of the first communications device; and collecting the test result information via the respective processor of the first communications device. The storing of the state information, the storing of the test result information, and the storing of the parameter values may be performed via the respective processor of the first communications device.

The generating a machine-readable symbol representation, via at least one processor may include generating an electronic representation of a two-dimensional machine-readable symbol at the first communications device and may further include optically displaying a visual representation of the two-dimensional machine-readable symbol by a display screen of the first communications device. The storing of the state information, the storing of the test result information, and the storing of the parameter values may each be performed via a processor of a first server, the first server remotely located from at least the first communications device and communicatively coupled therewith.

The generating a machine-readable symbol representation, via at least one processor may include generating an electronic representation of a two-dimensional machine-readable symbol at the first server, and may further include transmitting the electronic representation of the two-dimensional machine-readable symbol from the first server to the first communications device.

The generating a machine-readable symbol representation, via at least one processor may further include optically displaying a visual representation of the two-dimensional machine-readable symbol by a display screen of the first communications device.

The method may further include optically reading the visual representation from the display screen of the first communications device; decoding the visual representation to obtain at least a portion of at least one of the following data: the state information, the test result information, and the number of parameter values; and storing an electronic representation of the decoded data. The collecting test result information that represents a respective test result for each of a number of tests executed by the first communications device via the mobile services carrier network may include collecting test results representative of at least one of: content performance, content key performance indicators, user experience, user quality, sensor performance, sensor key performance indicators, a network service performance, a network service availability, a network service key performance indicator, an over-the-top service performance, an over-the-top service availability, or an over-the-top key performance indictor. The collecting state information that represents at least one state of at least one of the first communications device or the mobile services carrier network may include collecting information that represents at least one state of the first communications device with respect to a first test of the number of tests and collecting information that represents at least one state of the mobile services carrier network respect to the first test of the number of tests. Storing test result information that represents a respective test result for each of a number of tests executed by the first communications device via the mobile services carrier network may include storing test results representative of at least one of: content performance, content key performance indicators, user experience, user quality, sensor performance, sensor key performance indicators, a network service performance, a network service availability, a network service key performance indicator, an over-the-top service performance, an over-the-top service availability, or an over-the-top key performance indicator.

The encoding may further include encoding condition data into the machine-readable symbol, wherein the condition data is related to conditions of at least one of the network or the content server. The condition data may include at least one of: content availability, environmental data, time, date, and power measurements. Generating a machine-readable symbol representation may include generating at least one of: a linear barcode representation or a two-dimensional or quick response (QR) code representation.

A first communications device that tests mobile services provided via a mobile services carrier network may be summarized as including non-transitory computer readable media that stores: state information that represents at least one state of at least one of the first communications device or the mobile services carrier network; test result information that represents a respective test result for each of a number of tests executed by the first communications device via the mobile services carrier network; and a number of parameter values that represent parameter values for a number of parameters of each of the number of tests executed by the first communications device via the mobile services carrier network; and a data encoder that generates a machine-readable symbol representation that encodes in a relative spacing between a plurality of marks and spaces between the marks the stored state information, the stored test result information, and the stored number of parameter values, for each of the number of tests executed by the first communications device via the mobile services carrier network. The machine-readable symbol representation may include an electronic representation of a two-dimensional machine-readable symbol.

The first communications device may further include a display screen that renders a visual representation of the machine-readable symbol representation as a two-dimensional machine-readable symbol.

The first communications device may further include a data collection component that collects the state information and the test result information. The state information, the test result information, and the parameter values stored on the non-transitory computer readable media may be collected by the data collection component.

The data encoder may further generate an electronic representation of the machine-readable symbol as a two-dimensional machine-readable symbol, and may further include a display screen that optically displays a visual representation of the two-dimensional machine-readable symbol.

The first communications device may further include a communications interface that transmits at least some of the state information, the test result information, and the parameter values to a server remotely located from at least the first communications device and communicatively coupled therewith.

The communications interface may further receive an electronic representation of a two-dimensional machine-readable symbol from the server.

The first communications device may further include a display screen that optically displays a visual representation of the two-dimensional machine-readable symbol.

The visual representation may be optically read and decoded by a test apparatus, and an electronic representation of the decoded visual representation may be stored on a server. The test result information that represents a respective test result for each of a number of tests executed by the first communications device via the mobile services carrier network may include test results representative of at least one of: content performance, content key performance indicators, user experience, user quality, sensor performance, sensor key performance indicators, a network service performance, a network service availability, a network service key performance indicator, an over-the-top service performance, an over-the-top service availability, or an over-the-top key performance indictor. The state information that represents at least one state of at least one of the first communications device or the mobile services carrier network may include information that represents at least one state of the first communications device with respect to a first test of the number of tests and information that represents at least one state of the mobile services carrier network respect to the first test of the number of tests. The test result information that represents a respective test result for each of a number of tests executed by the first communications device via the mobile services carrier network may include test results representative of at least one of: content performance, content key performance indicators, user experience, user quality, sensor performance, sensor key performance indicators, a network service performance, a network service availability, a network service key performance indicator, an over-the-top service performance, an over-the-top service availability, or an over-the-top key performance indictor.

The data encoder may further encode condition data into the machine-readable symbol, wherein the condition data may be related to conditions of at least one of the network or the content server. The condition data may include at least one of: content availability, environmental data, time, date, and power measurements.

The machine-readable symbol representation may include at least one of: a linear barcode representation or a two-dimensional or quick response (QR) code representation.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, networks including packet switching networks or cellular networks and related infrastructure (e.g., base stations, home resource locator system, visitor resource locator system, SS7 systems) as well as networks and other communications channels have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment," "one implementation," "an embodiment," or "an implementation" means that a particular feature, structure or characteristic described in connection with the embodiment or implementation is included in at least one embodiment or implementation. Thus, the appearances of the phrases "in one embodiment," "in one implementation," "in an embodiment," or "in an implementation" in various places throughout this specification are not necessarily all referring to the same embodiment or implementation. Furthermore, the particular features, structures, or characteristics may be combined in any suitable manner in one or more embodiments or implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
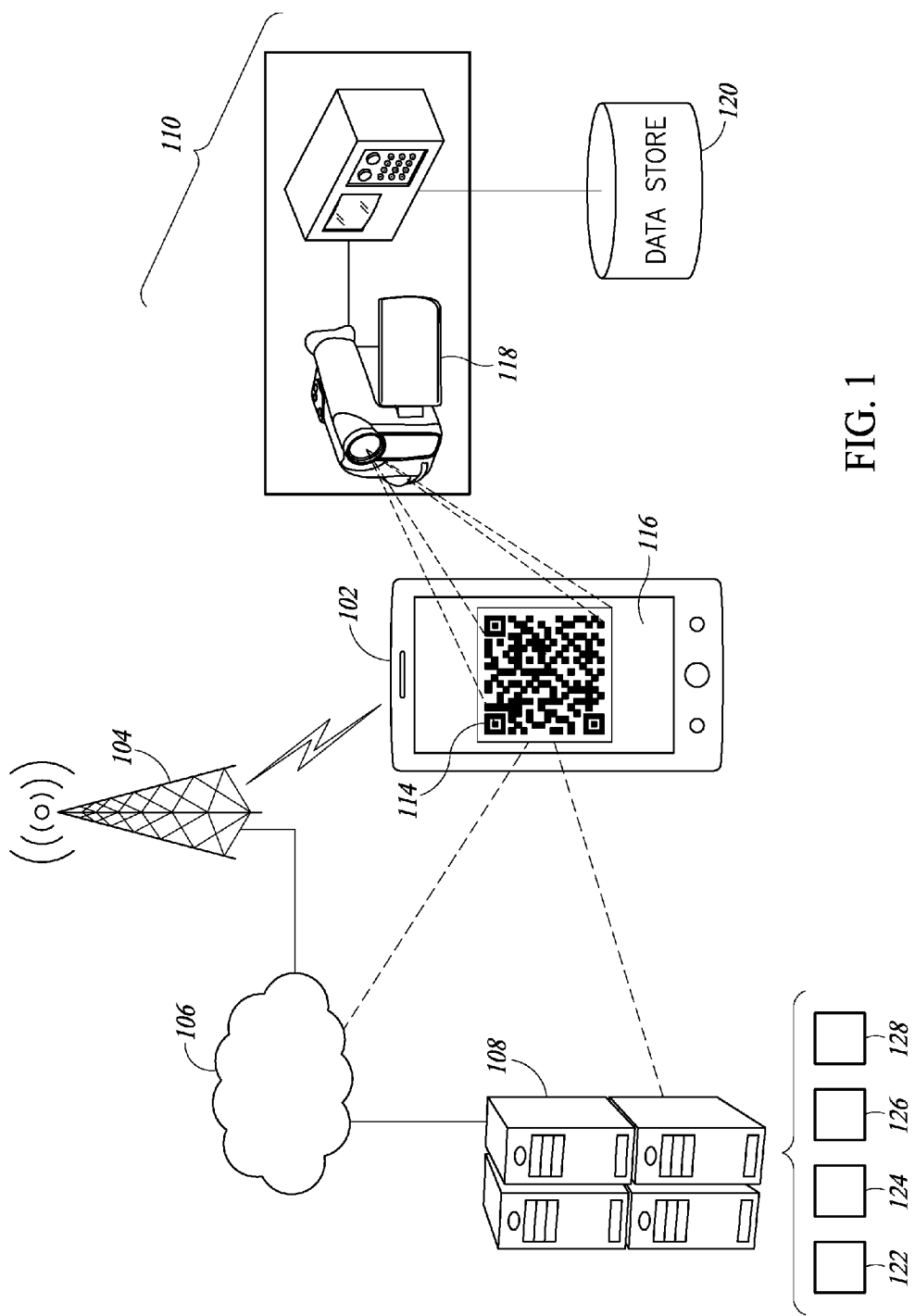
FIG. 1 is a schematic diagram of a networked environment, including a mobile device, a cellular or wireless access point, a service provider's network and server, and a test and measurement system, according to one illustrated implementation.

FIG. 1 is a schematic diagram of a networked environment 100, including a mobile or communications device 102, a cellular or wireless access point 104, a service provider's network 106 and server 108, and a test and measurement system 110, according to one illustrated implementation. The mobile or communications device 102 may be, as a non-exclusive list of examples, a portable email device, personal digital assistant, cell phone, smart phone, satellite phone, palmtop computing device, laptop, tablet computing device, game console, media player or other device with wireless communications capabilities and that includes or combines capabilities of any or all of these. The mobile device 102 is communicatively coupled to a service provider's network 106 via the wireless access point 104. The mobile device communicates with the wireless access point 104 via one or more radios (e.g., transmitters, receivers, transceivers) compliant with one or more wireless standards, such as, for example, WI-FI™ standards, BLUETOOTH™ standards, Near Field Communication (NFC) standards, cellular standards (e.g., GSM, CDMA), and the like.

As shown in FIG. 1, the mobile device 102 is used to perform one or more tests related to the quality and performance capabilities provided by the service provider's network 106 and services. In some implementations, the tests performed by the mobile device 102 may be related to one or more applications or functions being executed by the mobile device 102. To perform the testing, the mobile device 102 may transmit one or more testing requests to the service provider's server 108 via the access point 104 and the service provider's network 106. In addition to transmitting the testing request(s), the mobile device 102 may also store various information or data related to the testing request. This additional data may include, for example, information related to test parameter values and information related to one or more states of the mobile device when the mobile device transmitted the testing requests. Such state information may include, for example, device runtime information, device key performance indicators ("KPIs"), and/or network or radio frequency information. In response to receiving the testing request(s), the server 108 collects various data related to network and/or application performance. Such data may include, for example, IP addresses 122, one or more proxy addresses 124, a user-agent string 126, other Web connection statistics 128, and other data as discussed below.

In some implementations, the server 108 transmits the collected data regarding network or application performance back to the mobile device 102 via the service provider's network 106. The server 108 may also transmit to the mobile device 102 additional information, such as, for example, information related to one or more states of the server 108 or other components of the service provider's network 106. The mobile device 102 receives the data transmitted by the server 108, and may then use the performance and/or state-related data received from the server 108, along with the test parameter values and the state information related to the mobile device 102, to generate a machine-readable symbol representation 114, for example, the quick response ("QR") code symbol shown in FIG. 1, that encodes the various test- and state-related data. The machine-readable symbol representation 114 may take other forms, such as a barcode symbol, and may encode the data into a one-dimensional or a multi-dimensional machine-readable symbol. In some implementations, the encoding for the machine-readable symbol representation 114 may be based upon a relative sizing of each of a plurality of marks. In some implementations, the encoding is based upon the relative spacing between a plurality of marks in which the spacing is dependent upon at least the size of the marks and the space between each mark.

In some implementations, the server 108 may generate and encode data into the machine-readable symbol representation 114. The server 108 may then transmit the machine-readable symbol representation 114 to the mobile device 102. In such implementations, the server 108 may encode one or more of the test results, the test parameters, the state information (related to the server 108, the mobile device 102, and/or other network components), or other data into the machine-readable symbol representation 114.

The mobile device 102 may render an electronic or digital representation of the machine-readable symbol 114 as a visible machine-readable symbol representation 114 on display interface 116. This visible machine-readable symbol representation 114 may be optically captured by the test and measurement system 110. For example, as shown in FIG. 1, the test and measurement system 110 includes an optical capture device 118, such as a camera or imager, that captures the machine-readable symbol representation 114 rendered on display interface 116. The test and measurement system 110 decodes the machine-readable symbol representation 114 to obtain the encoded information or data, such as the data related to one or more of the test results, the test parameters, and the state information. The test and measurement system 110 may then store the decoded data, for example, in one or more non-transitory processor-readable media via one or more servers 120. In some implementations, one or more of the server 120 may be located remotely from the optical capture device 118.

Figure 2:
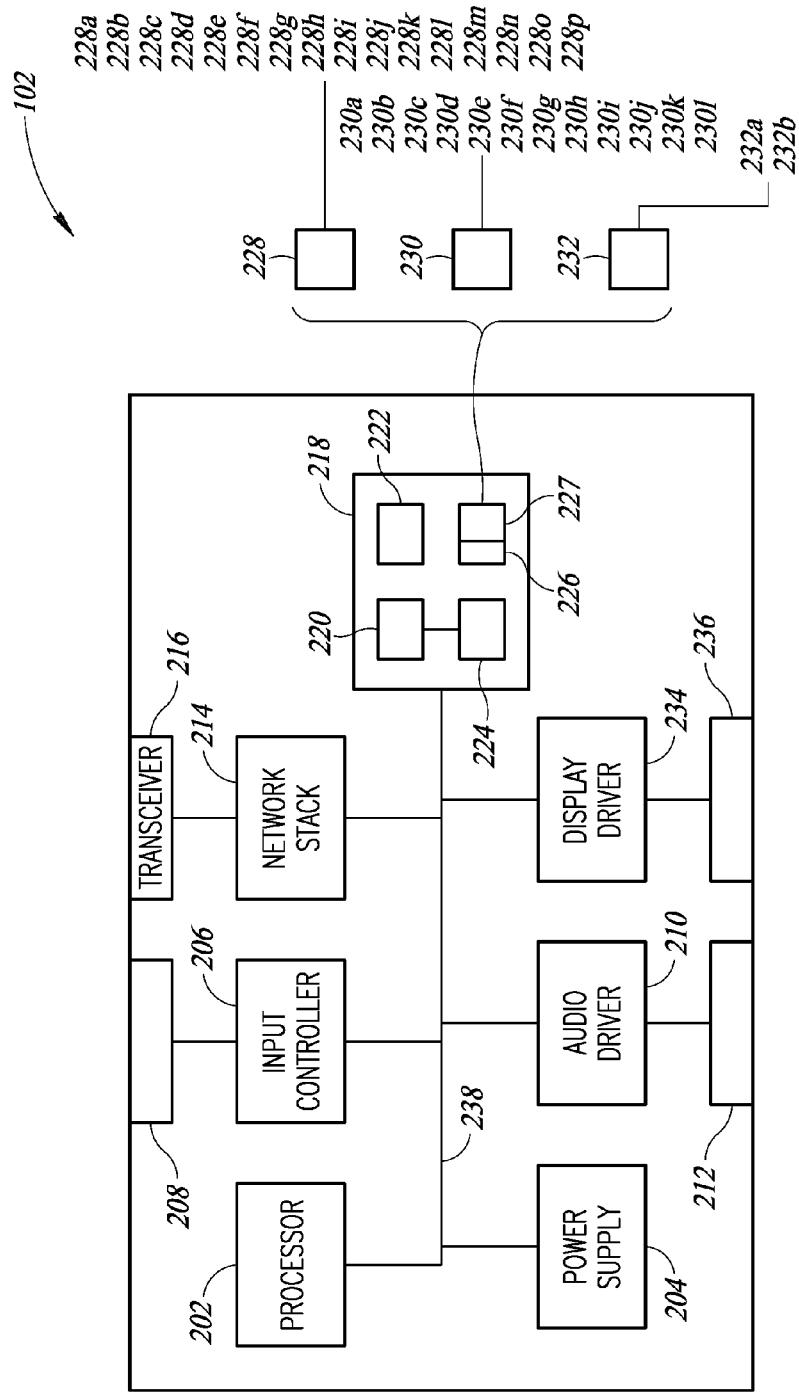
FIG. 2 is a block diagram of a mobile device that displays and/or transmits an electronic representation of the machine-readable symbol, according to one illustrated embodiment.

FIG. 2 shows the mobile device 102 that displays a visual or optical representation 114 of the machine readable symbol and/or transmits an electronic representation of the machine-readable symbol, according to one illustrated embodiment. The mobile device 102 includes at least one processor 202, a power supply 204, an input controller 206 and associated input devices 208, an audio driver 210 and associated audio output components 212, a network interface controller 214 and associated transceiver 216, one or more processor-readable memories 218 that store data 220, an operating system 222, one or more applications 224, a testing routine 227 and an associated application program interface ("API") 226, and a display driver 234 and associated display 236. Each of these components may be communicatively connected by bus(es) 238, which can provide bidirectional communication between the various components of the mobile device 102. Bus(es) 238 may take, for example, the form of a plurality of buses (e.g., data buses, instruction buses, power buses) included in at least one body.

The processor(s) 202 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The at least one processor 202 may be referred to in the singular, but may be two or more processors.

The mobile device 102 may also include one or more power supplies 204, which provide electrical power to the various components of the mobile device 102 via power connections. The power supplies 204 may be an internal power supply, such as a secondary battery, ultra-capacitor, fuel cell, or the like.

The mobile device 102 may include one or more input controllers 206 that facilitate and process inputs received from one or more input devices 208. The input devices 208 may include a touch screen or keyboard, a pointing device such as a mouse, and/or via a graphical user interface. Other input devices 208 can include a microphone, joystick, game pad, tablet, scanner, etc. These and other input devices 208 are communicatively coupled to the mobile device 102 through an interface 207 such as a serial port interface, although other interfaces such as a parallel port, a game port, or a universal serial bus ("USB") can be used. In some implementations, the input controller 206 and input interface 207 may be included in a combined integrated circuit, or chip, and transceiver that enable wireless communication between the mobile device 102 and peripheral input devices 208 through one or more radios and antenna compliant with one or more wireless protocols. Such wireless protocols may include, for example, Bluetooth™, IEEE 802.11b (or other Wi-Fi standards), infrared data association (IrDA), radiofrequency identification (RFID), or other such protocols that enable peripheral input devices 208 to communicate with the mobile device 102.

The mobile device 102 may include an audio driver 210 and associated audio output components 212. The audio output components 212 may include, for example, one or more speakers that provide an audible output for users of the mobile device 102. The audio output components 212 may include one or more peripheral components that are separate from the mobile device 102, such as headphones or stand-alone speakers. In such implementations, the peripheral audio device may be connected to the mobile device 102 via a wired connection or via a wireless connection using one or more radios or antenna compliant with one or more wireless protocols, such as Bluetooth™, IEEE 802.11b (or other Wi-Fi standards), infrared data association (IrDA), radio-frequency identification (RFID), or other such protocols.

The mobile device 102 may include a network interface controller 214 that enables the mobile device 102 to communicate with one or more communications or data networks. The network interface controller 214, for example, may include one or more wireless carrier network stacks that enable the mobile device 102 to transmit data through the service provider's network 106. Suitable communication protocols include FTP, HTTP, Web Services, SOAP with XML, WI-FI™ compliant, BLUETOOTH™ compliant, cellular (e.g., GSM, CDMA), and the like. Suitable transportation protocols include TCP/IP, SCTP, DCCP, and the like.

The transceiver 216 can include any device capable of transmitting and receiving communications via electromagnetic energy. The transceiver 216 may enable communications over a cellular network, and may include a CDMA transceiver, a GSM transceiver, a 3G transceiver, a 4G transceiver, an LTE transceiver, and any similar current or future developed computing device transceiver having at least one of a voice telephony capability or a data exchange capability. In at least some instances, the cellular transceiver 216 can include more than one interface. For example, in some instances, the cellular transceivers 216 can include at least one dedicated, full- or half-duplex, voice call interface and at least one dedicated data interface. In other instances, the cellular transceivers 216 can include at least one integrated interface capable of contemporaneously accommodating both full- or half-duplex voice calls and data transfer. The transceiver 216 may enable communications over other types of wireless or wired networks, such as local area networks (LANs) or Wide Area Networks (WANs), and may include packet switched communications networks such as the Internet, Worldwide Web, extranets, and/or intranets.

The mobile device 102 may include one or more processor-readable memories 218. The processor-readable memories 218 may include one or more non-transitory storage media, for example one or more non-volatile and/or volatile non-transitory storage media, for instance one or more read only memories (ROM), random access memories (RAM), registers, Flash memory, spinning magnetic media and drive, spinning optical media and drive, etc. The processor-readable memories 218 may be used to store data 220, such as, for example, data related to the operation of the mobile device 102 or communications with the cellular network 106.

The processor-readable memories 218 may store one or more operating systems 222, such as the iOS® operating system provided by Apple Inc., the Android® operating system provided by Google Inc., the Windows® Phone operating system provided by Microsoft Corp., or other similar operating systems. The processor-readable memories 218 may store one or more applications 224 that comprise logic or machine executable instructions that, when executed by the processor 202, provide functionality to the mobile device 102. In at least some instances, the applications 222 may be downloaded or otherwise acquired by the end user, for example using an online marketplace such as the Apple App Store, Amazon Marketplace, or Google Play marketplaces. In some implementations, such applications 224 may start up in response to selection of a corresponding user selectable icon by the user or consumer.

The processor-readable memories 218 may store the testing routine API 226 that enables the mobile device 102 to access the functionality provided by a testing routine 227 and render a visual or optical representation of the machine-readable symbol 114. The testing routine 227 may be stored on the processor-readable memories 218, and may include one or more sub-routines to be executed by the processor 202. The sub-routines may include a test process subroutine 228, a test data processing subroutine 230, and a machine-readable code generator subroutine 232. When executed, the test process subroutine 228 may cause the processor 202 to identify and store information and data related to a test process that has been initiated through the testing routine API 226. This information and data may be stored within the processor-readable memories 218 and include, for example, the state information of the mobile device 102 at the time that the test was requested through the testing routine API 226. Such state information may include, for example, device runtime information 228a, device KPIs 228b, and/or network or radio frequency information 228c. In addition or alternatively, the information and data collected and stored as a result of executing the test process subroutine 228 may include, for example, condition data such as content availability 228d, environmental data 228e, time 228f, date 228g, and power measurements 228h. The test process subroutine 228 may collect additional information and data, including information related to device performance 228i, application performance 228j, application availability 228k, application KPIs 228l, connected devices KPIs 228m, device hardware information 228n, device software information 228o, and manufacturer data 228p.

The test process subroutine 228 may cause the processor 202 to transmit one or more test request messages via the transceiver 216 through the network 106 to the service provider's server 108. The test request messages may be used to collect information and data regarding the quality of service and other performance characteristics provided by the service provider's network 106 and/or server 108. The transceiver 216 may receive one or more messages from the server 108 in response to the test request messages. In some implementations, the responsive messages received from the server 108 may include test result information generated by the server 108, and related to the operation and performance of the network 106.

The test data processing subroutine 230, when executed, may cause the processor 202 to process the information or data collected as a result of the test process subroutine 228. The resulting processed data may include, for example, test result data such as content performance 230a, content key performance indicators 230b, user experience 230c, user quality 230d, sensor performance 230e, sensor key performance indicators 230f, network service performance 230g, network service availability 230h, network service key performance indicator 230i, over-the-top service performance 230j, over-the-top service availability 230k, or over-the-top key performance indictor 230l. Some or all of the processed, test-result data 230a-230l may be stored within the processor-readable memories 218 of the mobile device 102. In some implementations, the mobile device 102 may receive some or all of the test result data 230a-230l from the server 106.

The machine-readable code generator subroutine 232, when executed, may cause the processor 202 to encode into a an electronic or digital representation of the machine-readable symbol 114 some or all of the information and data collected and/or produced by the test process subroutine 228 and the test data processing subroutine 230. In some implementations, the machine-readable code generator subroutine 232 may convert the data to be encoded into text format, serialize the text into binary format, and then use one or more software libraries to build an electronic or digital representation of the machine-readable symbol 114. The electronic or digital representation of the machine-readable symbol 114 may be stored on the mobile device 102, for example, as an electronic representation of a linear barcode representation 232a or a two-dimensional or quick response (QR) code representation 232b that is selectively optically displayable via a respective display screen 236 of the mobile device 102. The electronic or digital representation of the machine-readable symbol 114 may include additional information or images. For example, the electronic or digital representation of the machine-readable symbol 114 may include one or more synchronization cues that enable a reading device to detect, capture, and process the visual or optical representation of the machine-readable symbol 114 as rendered on the display 236.

The mobile device 102 may include a display driver 234 and associated display 236. The display 236 may include a touchscreen or a touch sensitive display device, such as a resistive touchscreen or a capacitive touchscreen. The driver 234 and display 236 may be used to render the visual or optical representation of the linear barcode 232a, or the visual or optical representation of the two-dimensional or QR code 232b generated by the machine-readable code generator subroutine 232 of the testing routine 227. In some implementations, the driver 234 and display 236 may render a visual or optical representation of the linear barcode 232a, and/or a visual or optical representation of the two-dimensional or QR code 232b that has been generated by some device other than the mobile device 102 (e.g., the server 108). To render a visual or optical representation of the machine-readable symbol 114, the display driver 234 may cause the pixels within the display 236 to be appropriately colored black or white to create a plurality of marks formed by sets of black-colored pixels and intervening spaces formed by sets of white-colored pixels. The sizes of the marks and/or the spacing between the marks may be used to encode the data within the machine-readable symbol.

Figure 3:
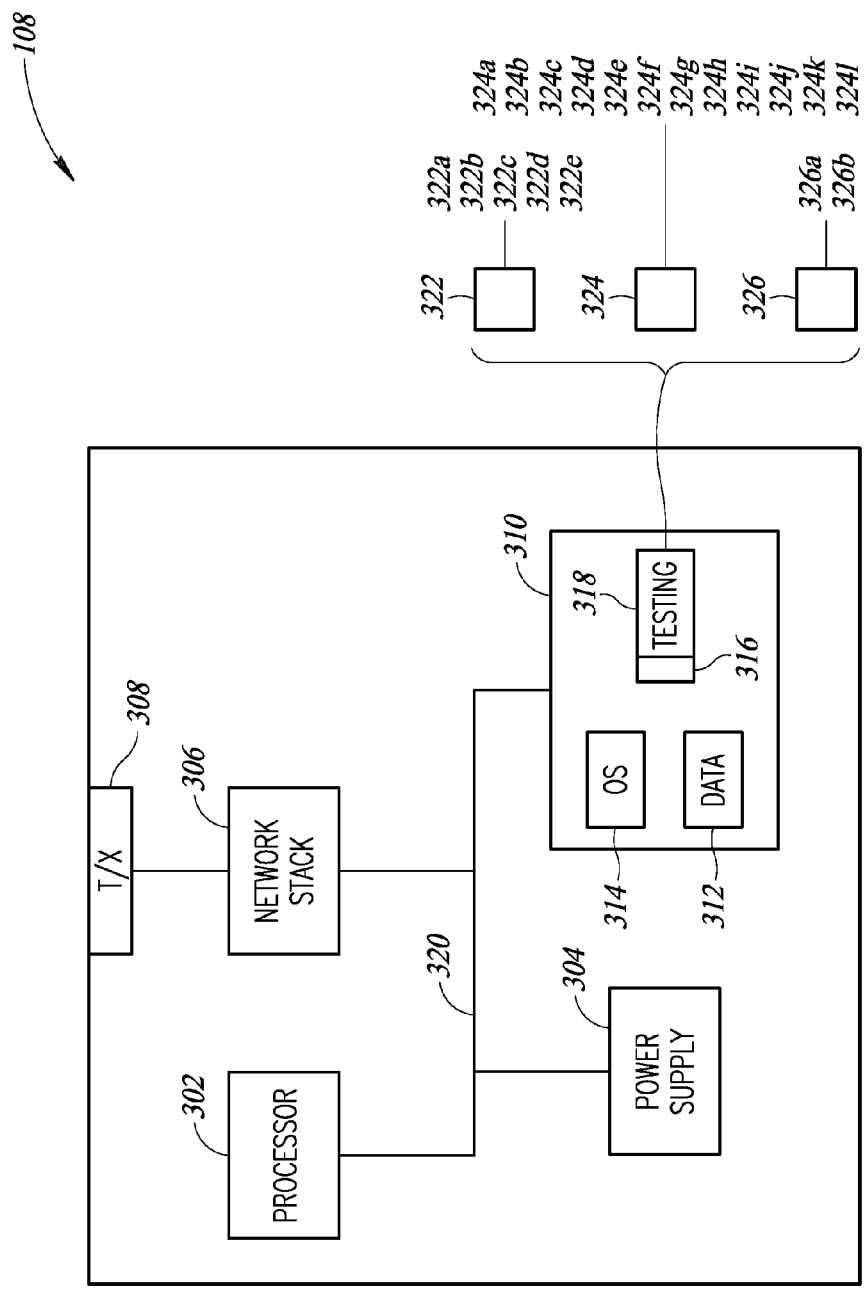
FIG. 3 is a block diagram of a server provided by a content provider or a service provider that is communicatively coupled to a mobile device for testing, according to one illustrated embodiment.

FIG. 3 shows the server 108 of a content provider or a service provider that is communicatively coupled via the network 106 to a mobile device 102 for testing, according to one illustrated embodiment. The server 108 includes at least one processor 302, a power supply 304, a network access routine 306 and associated transceiver 308, and one or more memories 310 that store data 312, an operating system 314, and a testing routine 316 and associated application program interface ("API") 318. Each of these components may be communicatively connected by bus(es) 320, which can provide bidirectional communication between the various components of the server 108. Bus(es) 320 may take, for example, the form of a plurality of buses (e.g., data buses, instruction buses, power buses) included in at least one body.

The processing unit 302 may be any logic processing unit, such as one or more central processing units (CPUs), digital signal processors (DSPs), application-specific integrated circuits (ASICs), field programmable gate arrays (FPGAs), etc. The power supply 304 may include one or more power supplies 304, which provide electrical power to the various components of the server 108 via power connections. The power supplies 304 may be an internal power supply, such as a battery, energy source, fuel cell, or the like.

The server 108 may include a network access routine 306 and associated transceiver 308 to enable the server 108 to communicate with one or more communications or data networks. The network access routine 306 may include one or more communications stacks to facilitate such network communication. Communications may be via a wired and/or a wireless network architecture, for instance, wired and wireless enterprise-wide computer networks, intranets, extranets, and/or the Internet. Other embodiments may include other types of communications networks including telecommunications networks, cellular networks, paging networks, and other mobile networks. There may be any variety of computers, switching devices, routers, bridges, firewalls and other devices in the communications paths between the server 108 and the mobile device 102. The transceiver 308 may be used by the server 108 to receive test requests from one or more mobile devices 102.

The system memory 310 includes read-only memory ("ROM") and random access memory ("RAM"). The system memory 310 may comprise a hard disk drive for reading from and writing to a hard disk, an optical disk drive for reading from and writing to removable optical disks, and/or a magnetic disk drive for reading from and writing to magnetic disks. The optical disk can be a CD-ROM, while the magnetic disk can be a magnetic floppy disk or diskette. The hard disk drive, optical disk drive, and magnetic disk drive may communicate with the processor 302 via the system bus 320. Those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

The system memory 310 can be used to store data 213 as well as one or more programs, such as an operating system 314, and a testing routine 316 and associated API 316. The testing routine API 318 enables the server 108 to access the functionality provided by a testing routine 316. The testing routine 316 may include one or more sub-routines to be executed by the server processor 302. The sub-routines may include a test process subroutine 322, a test data processing subroutine 324, and a machine-readable code generator 326. When executed, the test process subroutine 322 may cause the server processor 302 to execute instructions to identify and store information and data related to a test process that has been initiated by a requesting mobile device 102. This information and data may be stored within memory 310 and include, for example, the state information of the server 108 at the time that the test request was received at the testing routine API 316. In addition or alternatively, the information and data collected and stored as a result of executing the test process subroutine 322 may include, for example, content availability 322a, environmental data 322b, time 322c, date 322d, and power measurements 322e.

The test data processing subroutine 324, when executed, may cause the server processor 302 to process the information or data collected as a result of the test process request received from the mobile device 102. The resulting processed data may include, for example, content performance 324a, content key performance indicators 324b, user experience 324c, user quality 324d, sensor performance 324e, sensor key performance indicators 324f, network service performance 324g, network service availability 324h, network service key performance indicator 324i, over-the-top service performance 324j, over-the-top service availability 324k, or over-the-top key performance indictor 324l. Some or all of the processed data 324a-324l may be stored within memory 310 of the server 108. In some implementations, the server 108 may have received some or all of the data 324a-324l from one or more mobile devices 102.

The machine-readable code generator 326, when executed, may cause the server processor 302 to encode into an electronic or digital representation of a machine-readable symbol 114 some or all of the information and data collected and/or produced by the test process subroutine 322 and the test data processing subroutine 324. In some implementations, the machine-readable code generator 326 may convert the data to be encoded into a text format, serialize the text into binary format, and then use one or more software libraries to build an electronic or digital representation of the machine-readable symbol 114. The electronic or digital representation of the machine-readable symbol 114 may be transmitted to the mobile device 102, for example, as an electronic representation of a linear barcode representation 232a or a two-dimensional or quick response (QR) code representation 232b that is selectively optically displayable via the display screen 236 of the mobile device 102.

Figure 4:
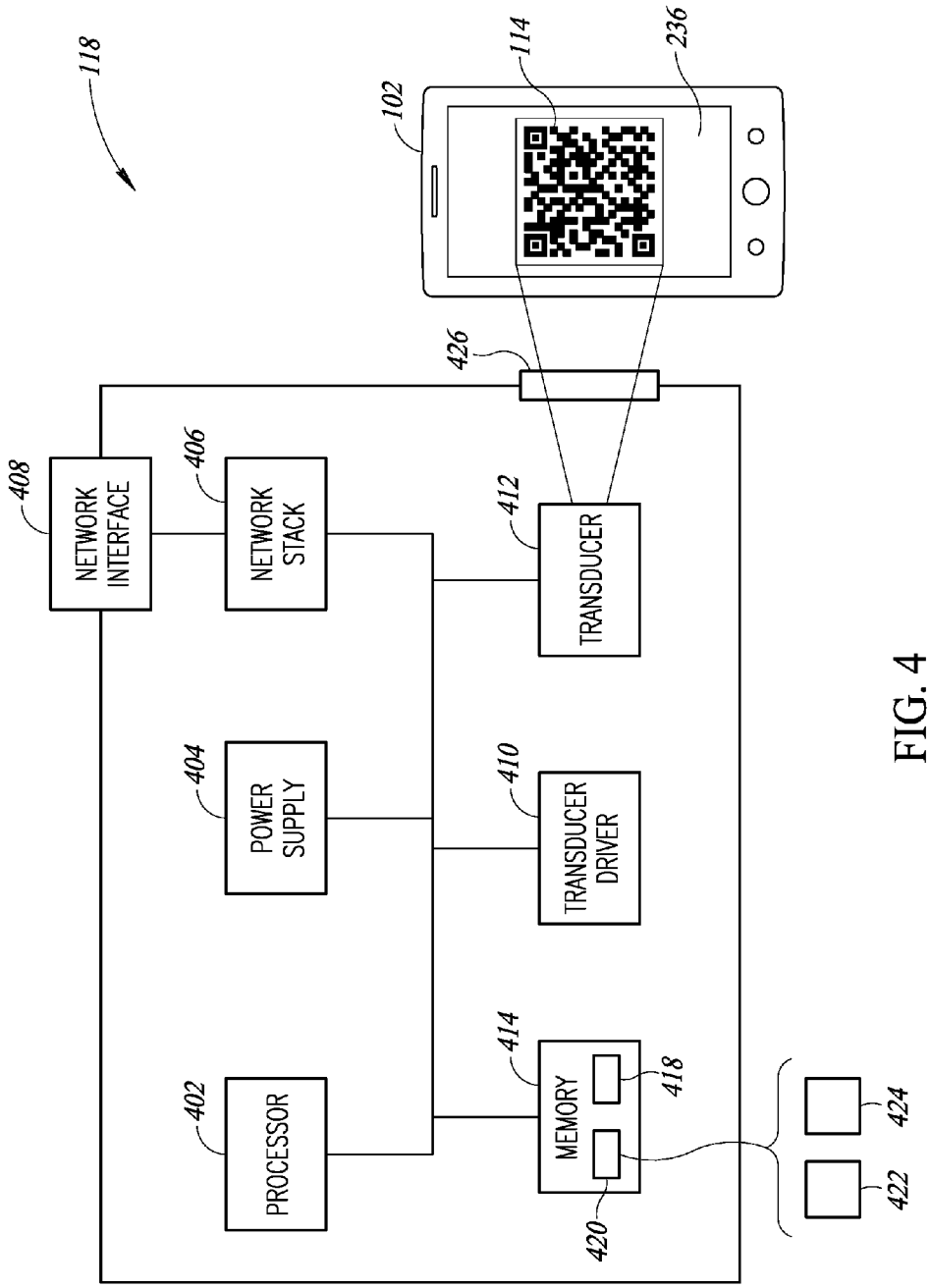
FIG. 4 is a block diagram of an optical capture device that captures and stores images from an optical display of a mobile device, according to one illustrated embodiment.

FIG. 4 is a block diagram of the optical capture device 118 that captures and stores images from an optical display of the mobile device 102, according to one illustrated embodiment. The optical capture device 118 includes a processor 402, a network controller 404 and associated network interface 406, a power supply 408, a transducer driver 410 and a transducer 412, and a system memory 414. Each of these components may be communicatively connected by bus(es) 416, which can provide bidirectional communication between the various components of the server 108. Bus(es) 416 may take, for example, the form of a plurality of buses (e.g., data buses, instruction buses, power buses) included in at least one body.

The processing unit 402 for the optical capture device 118 may be any logic processing unit, such as one or more central processing units (CPUs), digital signal processors (DSPs), application-specific integrated circuits (ASICs), field programmable gate arrays (FPGAs), etc. The power supply 404 for the optical capture device 118 may include one or more power supplies 404, which provide electrical power to the various components of the optical capture device 118 via power connections. The power supplies 404 may be an internal power supply, such as a battery, energy source, fuel cell, or the like.

The optical capture device 118 may include a network access component 406 and associated transceiver 408 to enable the optical capture device 118 to communicate with one or more communications or data networks. The network access component 406 may include one or more communications stacks to facilitate such network communication. Communications may be via a wired and/or a wireless network architecture, for instance, wired and wireless enterprise-wide computer networks, intranets, extranets, and/or the Internet. Other embodiments may include other types of communications networks including telecommunications networks, cellular networks, paging networks, and other mobile networks.

The optical capture device 118 includes one or more transducers 412 and transducer drivers 410 that can be used to capture images or other information from the environment proximate the optical capture device 118 within the detection range of the transducers 412. For example, the transducer 412 may include an imager (e.g., CCD array) that captures images of one or more fields-of-view extending outward from the optical capture device 118, or may include an optical detector (e.g., photodiode) that detects a scanning laser beam reflected or otherwise returned to the optical capture device 118. The transducer 412 may be located within the interior of the optical capture device 118 and have a field-of-view that extends outward from the optical capture device 118 through one or more optical lenses 426. The optical capture device 118 may include one or more of a machine-readable symbol reader engines to optionally illuminate and to optically read information from machine-readable symbols (e.g., one-dimensional or linear machine-readable symbols such as barcode symbols, two-dimensional machine-readable symbols, for instance quick response (QR) code symbols, or the like).

As shown in FIG. 4, the mobile device 102 may be located on the exterior of the optical capture device 118 and have rendered on its display 236 a visual or optical representation of the machine-readable symbol 114 that is within the field-of-view of transducer 412. The transducer 412 forms an electronic representation of the optical or visual representation of the machine-readable symbol 114 rendered on the display 236 of the mobile device 102. For example, the transducer 412 may comprise a wide range of image sensors that convert optical images (or another wavelength in the electromagnetic spectrum) into electrical signals. The transducer 412 may comprise a digital sensor, such as a charge-coupled device (CCD) sensor array or complementary metal-oxide semiconductor (CMOS) sensor array, both of which form a one-dimensional or two-dimensional array of pixels, which together constitute an electronic representation of the image of the machine-readable symbol. The transducer 412 may comprise a photodiode or other sensor that detects an intensity of light, such as that from a laser beam, that is emitted by the optical capture device 118 and returned from the visual or optical representation of the machine-readable symbol 114 as rendered on the display 236 of the mobile device 102. The transducer 412 may capture the information and data encoded within the visual or optical representation of the machine-readable symbol 114 in a reflectance profile that may be subject to further processing to decode and extract the encoded information and data.

The optical capture device 118 includes a memory 410 that may comprise a hard disk drive for reading from and writing to a hard disk, an optical disk drive for reading from and writing to removable optical disks, and/or a magnetic disk drive for reading from and writing to magnetic disks. The optical disk can be a CD-ROM, while the magnetic disk can be a magnetic floppy disk or diskette. The hard disk drive, optical disk drive, and magnetic disk drive may communicate with the processor 402 via the system bus 416. Those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Memory 414 can be used to store data 418 as well as one or more programs or applications 420, such as an image processing routine 422 and a machine-readable symbol decoder 424. The image processing routine 422 may have one or more sets of instructions that, when executed by the processor 402, cause the processor 402 to perform one or more procedures on the image (e.g., the reflectance profile) captured by the transducer 412. For example, the image processing routine 422 may include instructions for one or more signal processing and/or filtering procedures that can be used to identify light and dark shaded areas captured by the transducer 412 from the visual or optical representation of the machine-readable symbol 114. The image processing routine 422 may include instructions that can be used to determine the relative or actual distances between differently shaded areas (e.g., light shaded areas and dark shaded areas) on the visual or optical representation of the machine-readable symbol 114.

Once the distances for each of the shaded areas comprising the visual or optical representation of the machine readable symbol 114 have been identified, one or more sets of instructions from the machine-readable symbol decoder 424 may be executed to decode and extract the information and data stored in the visual or optical representation of the machine readable symbol 114. The optical capture device 118 may then store the decoded information and data in memory 414. Additionally, or alternatively, the optical capture device 118 may transmit the decoded information and data via the network interface 408 to one or more remote storage devices, such as remote server 120.

Figure 5:
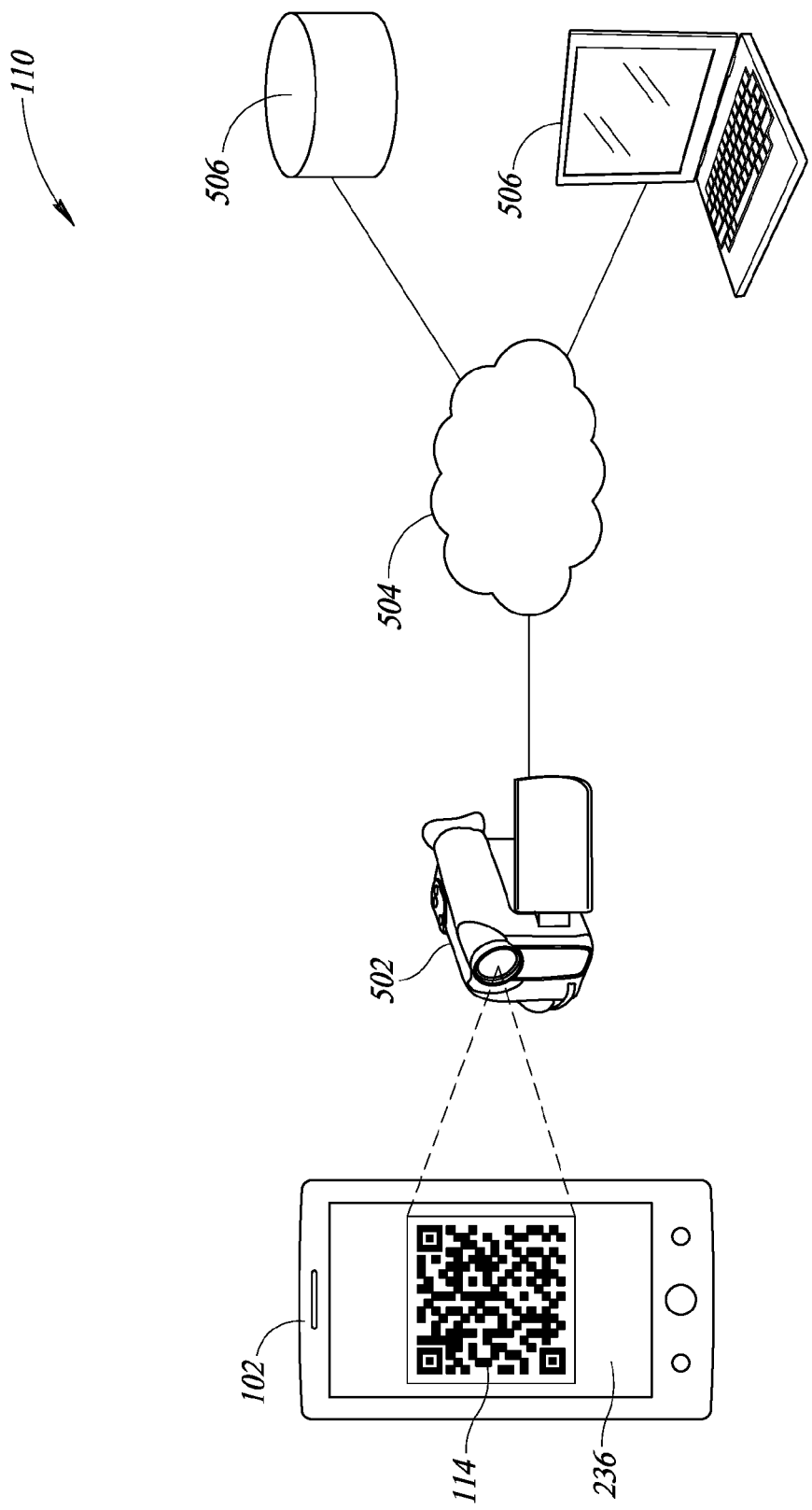
FIG. 5 is a schematic diagram of a test and measurement system that includes an optical capture device that is communicatively coupled via a communications network with one or more remote storage devices, according to one implementation.

FIG. 5 is a schematic diagram of a test and measurement system 110 that includes an alternative optical capture device 502 that is communicatively coupled via a communications network 504 with one or more remote servers 506, according to one implementation. The alternative optical capture device 502 depicted in FIG. 5 may include some or all of the components and functionality of the optical capture device 118 depicted in FIG. 4. In some implementations, however, one or more of the programs, applications, or routines 420 may be located on the remote servers 506. As a result, the alternative optical capture device 502 may include a transducer 412 and transducer driver 410 that enable the alternative optical capture device 502 to capture an optical image of the visual or optical representation of the machine-readable symbol 114 rendered on the display 236 of the mobile device 102 in the form, for example, of a reflectance profile. The alternative optical capture device 502 may then transmit the captured optical image over the network 504 to one or more of the servers 506, which may further process the reflectance profiles. Accordingly, the servers 506 may include an image processing routine for performing one or more signal processing and/or filtering procedures on the captured optical image, as discussed above. The servers 506 may include a machine-readable symbol decoder 424 to be used to decode and extract the information and data stored in the captured electronic or digital representation of the machine-readable symbol 114. The extracted information and data may be stored on one or more of the remote servers 506. In some implementations, one or more of the remote servers 506 may aggregate data from multiple optical capture devices 118/502, and execute additional programs or procedures to monitor the performance of various devices located and applications being executed at various locations throughout a network.

Figure 6:
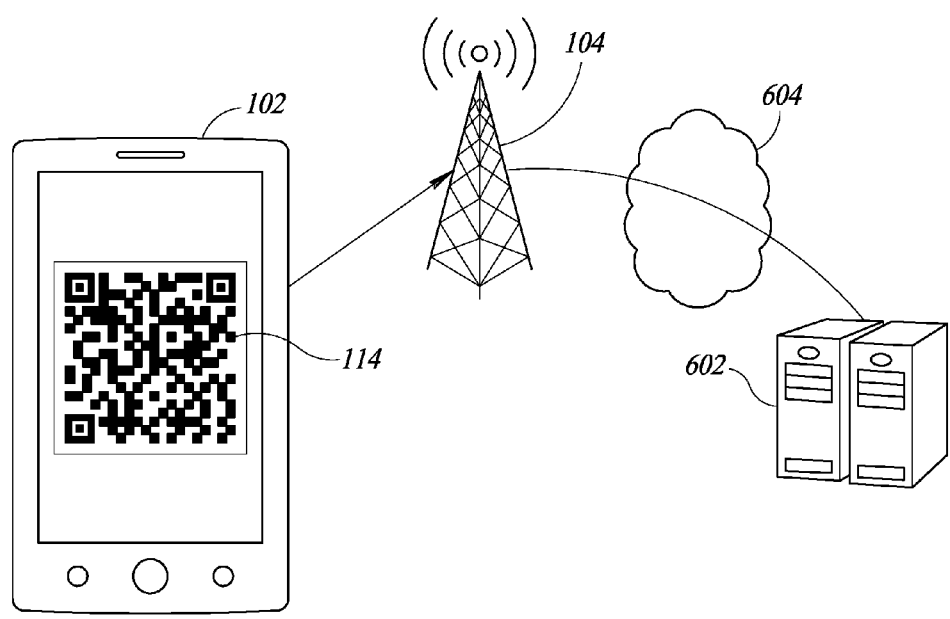
FIG. 6 is a schematic diagram of a test and measurement system in which a mobile device transmits a representation of a machine-readable symbol to a remote server, according to one implementation.

FIG. 6 shows a test and measurement system 110 in which a mobile device 102 transmits an electronic or digital representation of the machine-readable symbol 114 to a remote server 120, according to one implementation. As shown in FIG. 6, the electronic or digital representation of the machine-readable symbol 114 is not captured by an optical capture device 118. Instead, in such an implementation, the mobile device 102 transmits an electronic or digital representation of the machine-readable symbol 114 to the remote server 602 via the network access point 104 and network 604. The remote server 602 may include one or more application programs, such as the image processing routine 422 and/or the machine-readable symbol decoder 424 to decode and extract the data and information encoded within the electronic or digital representation of the machine-readable symbol 114.

Figure 7:
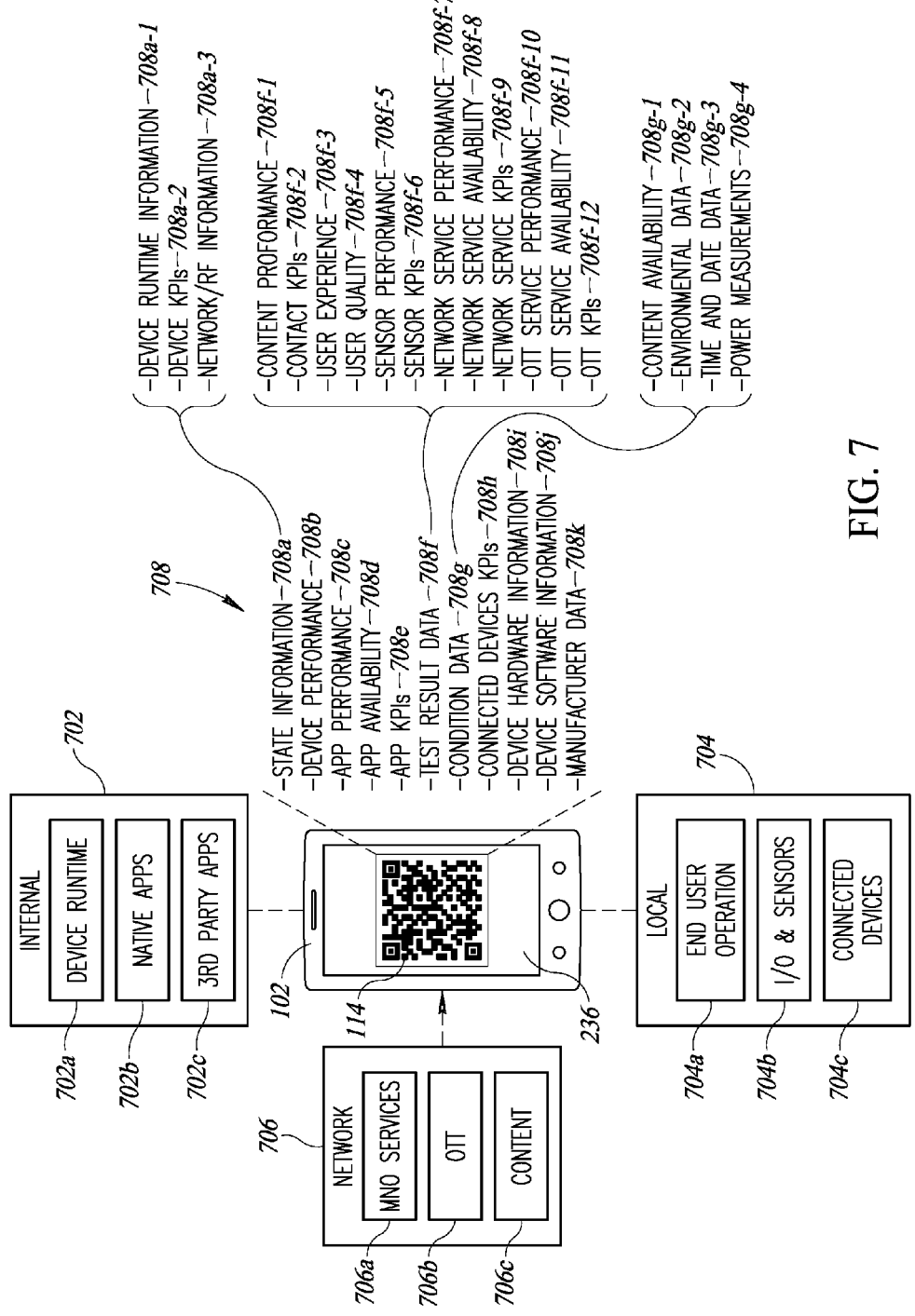
FIG. 7 is a schematic diagram that illustrates the various types of data that may be encoded within a machine-readable symbol displayed by a mobile device, according to one implementation.

FIG. 7 is a schematic diagram that illustrates the various types of data that may be encoded within a visual or optical representation of the machine-readable symbol 114 displayed by a mobile device 102, according to one implementation. As shown in FIG. 7, the mobile device 102 may accept inputs from multiple sources, including internal sources 702, local sources 704, and network sources 706. Internal sources 702 may include information and data collected from processes and applications that are being run internal to the mobile device 102, and may include, for example, runtime statistics 702a for the mobile device 102, native application information 702b, and third party application information 703c. Local sources 704 may include information and data collected from sources that monitor local events that are external to the mobile device 102. Such local sources may include, for example, user actions and operations 704a, input-output and sensor data 704b, and connected device data 704c. Network sources 706 may include information received and data derived via one or more network connections, such as mobile network operator service statistics 706a, data regarding over-the-top ("OTT") content 706b, and other content statistics 706c.

As previously discussed, the mobile device 102 can execute one or more sub-routines (e.g., the test process subroutine 228, the test data processing subroutine 230, and/or the machine-readable code generator subroutine 232) to encode data 708 in the electronic or digital representation of the machine-readable symbol 114. Such encoded data 708 may include data related to: state information 708a, device performance 708b, application performance 708c, application availability 708d, application KPIs 708e, test result data 708f, condition data 708g, connected devices KPIs 708h, device hardware information 708i, device software information 708j, and manufacturer data 708k. State information 708a may include, for example, device runtime information 708a-1, device KPIs 708a-2, and/or network or radio frequency information 708a-3. Test result data 708f may include information or data regarding one or more of content performance 708f-1, content KPIs 708f-2, user experience 708f-3, user quality 708f-4, sensor performance 708f-5, sensor KPIs 708f-6, network service performance 708f-7, network service availability 708f-8, network service KPIs 708f-9, OTT service performance 708f-10, OTT service availability 708f-11, and/or an OTT KPI 708f-12. Condition data 708g may further include data regarding content availability 708g-1, environmental data 708g-2, time and date data 708g-3, and power measurements 708g-4.

Figure 8:
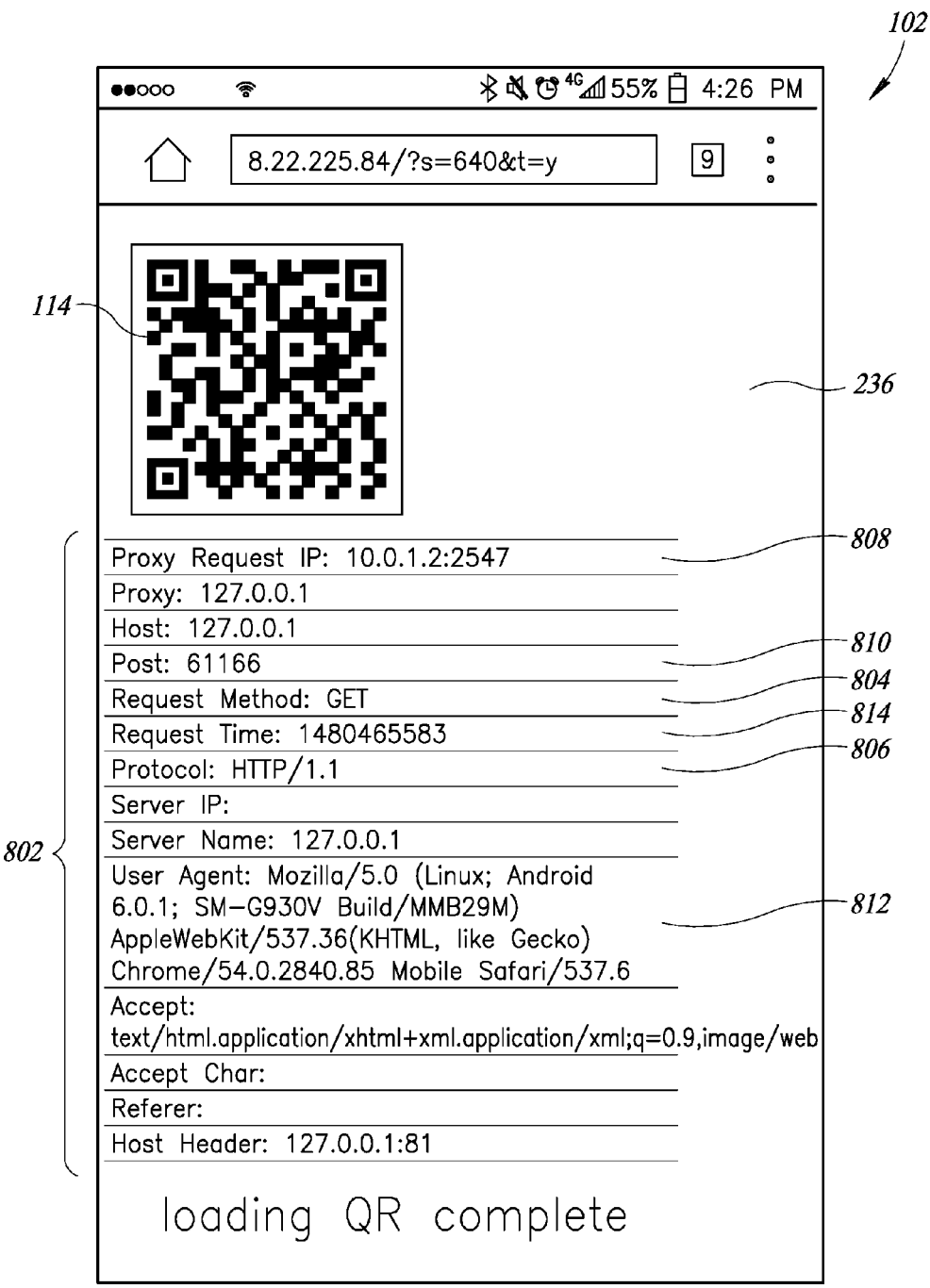
FIG. 8 is a screen print that illustrates an example of a machine-readable symbol and the information and data encoded within the symbol, according to one implementation.

FIG. 8 is a screen print that illustrates an example of a visual or optical representation of the machine-readable symbol 114 and the information and data 802 encoded within the visual or optical representation 114, according to one implementation. As shown in FIG. 8, the visual or optical representation of the machine-readable symbol 114 is a two-dimensional QR code symbol that is rendered on the display 236 of a mobile device 102. The QR code symbol is used to encode information and data 802 regarding a GET request (reference number 804) transmitted using HTTP (ref. no. 806) to a proxy located at the IP address 10.0.1.2 (ref. no. 808). The response was received on client port 61166 (ref. no. 810). The information and data 802 further includes the browser, or user agent 812, that submitted the GET request 804 and the time 814, as represented by UNIX epoch time, that the GET request was submitted.

Figure 9:
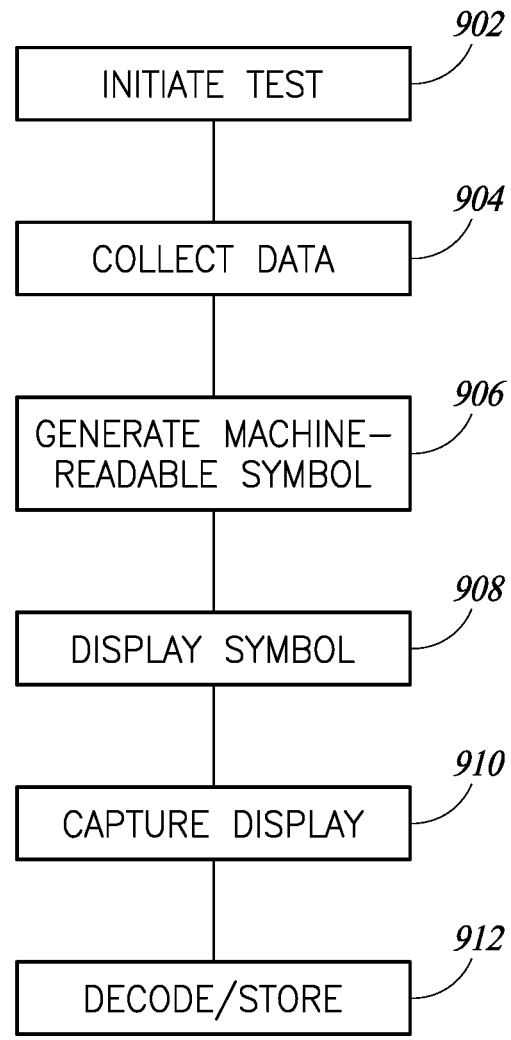
FIG. 9 is a flow diagram that illustrates initiating testing of network performance by a mobile device, displaying the test results by the mobile device in the form of a machine-readable symbol, and collecting the test results by a test and measurement system, according to one implementation.

FIG. 9 is a flow diagram that illustrates initiating testing of network performance by a mobile device 102, displaying the test results by the mobile device 102 in the form of a visual or optical representation of the machine-readable symbol 114, and collecting the test results by a test and measurement system 110, according to one implementation. At 902, the mobile device 102 initiates a test. As part of 902, the mobile device 102 may transmit a test request to the server 108 via a cellular or data network 106. The server 108 may be continuously executing a process by which it listens for such test requests from one or more mobile devices 102. In addition, the mobile device 102 may collect and store state information that represents at least one state of the mobile device 102 or the cellular or data network 106. In some implementations, the mobile device 102 may transmit the state information as part of, or in addition to, the test request sent to the server 108.

At 904, the server 108 collects data and information in response to the request received from the mobile device 102. The data and information may include, for example, test result information, parameter values, and/or condition data related to the test request, the network 106, and/or the mobile device 102. The test result information may include content performance, content KPIs, user experience, user quality, sensor performance, sensor KPIs, network service performance, network service availability, network service KPIs, OTT service performance, OTT service availability, and/or OTT KPIs. The condition data may include content availability, environmental data, time, date, and/or power measurements. Other data included within the sets of test result information, parameter values, and condition data may include device runtime information, device performance, device KPIs, application performance, application availability, application KPIs, connected devices KPIs, network and radio frequency information, device hardware information, device software information, and manufacturer data. In some implementations, the server 108 may collect and store the collected data and information in a list format.

At 906, an electronic or digital representation of the machine-readable symbol 114 is generated from the stored data and information, such as the stored state information, test result information, condition data, and/or parameter values. In some implementations, the server 108 generates the electronic or digital representation of the machine-readable symbol 114 and transmits the electronic or digital representation of the machine-readable symbol 114 to the mobile device 102. In some implementations, the server 108 transmits the list of collected data and information to the mobile device 102, which uses the received list to generate the electronic or digital representation of the machine-readable symbol 114. In such implementations, the mobile device 102 may include additional data and information collected from other sources (e.g., data and information that the mobile device 102 has collected) when generating the electronic representation of the machine-readable symbol.

The electronic or digital representation of the machine-readable symbol 114 may be a one- or multi-dimensional symbol that encodes the data and information using the relative spacing between a plurality of marks and intervening spaces. Such an electronic representation of the machine-readable symbol may be, for example, a linear barcode symbol or a multi-dimensional QR code symbol.

At 908, the mobile device 102 displays the visual or optical representation of the machine-readable symbol 114. In some implementations, the mobile device 102 may render a visual or optical representation of the machine-readable symbol 114 on the display 236.

At 910, the display of the visual or optical representation of the machine-readable symbol 114 is captured. In some implementations, the capture of the visual or optical representation of the machine-readable symbol 114 is performed by one or more components of the test and measurement system 110. In such implementations, an optical capture device 118 may optically capture a visual or optical representation of the machine-readable symbol 114 on the display 236 of the mobile device 102. In some implementations, the capture of the visual or optical representation of the machine-readable symbol 114 at 910 may be performed using a screen capture function on the mobile device 102. The mobile device 102 may then transmit the screen capture to the test and measurement system 110 via a network connection. In some implementations, the mobile device 102 may transmit an electronic or digital representation of the machine-readable symbol 114 directly to the test and measurement system 110. In such implementations, the display of the visual or optical representation of the machine-readable symbol 114 by the mobile device 102 at 908 may optionally be skipped.

At 912, the captured electronic or digital representation of the machine-readable symbol 114 is decoded to extract the encoded information. The decoded information may then be stored, e.g., in a database, or as part of an XML or JSON file.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those of skill in the art will recognize that many of the methods or algorithms set out herein may employ additional acts, may omit some acts, and/or may execute acts in a different order than specified.

The various implementations described above can be combined to provide further implementations. In addition, all of the U.S. patents, U.S. patent application publications, U.S. patent applications, foreign patents, foreign patent applications and non-patent publications referred to in this specification and/or listed in the Application Data Sheet, if any, are incorporated herein by reference, in their entirety. Aspects of the embodiments can be modified, if necessary, to employ concepts of the various patents, applications and publications to provide yet further embodiments. These and other changes can be made to the implementations in light of the above-detailed description.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for use in testing mobile services provided to at least a first communications device via a mobile services carrier network, the method comprising:
    storing state information that represents at least one state of at least one of the first communications device or the mobile services carrier network;
    storing test result information that represents a respective test result for each of a number of tests executed by the first communications device via the mobile services carrier network;
    storing a number of parameter values that represent parameter values for a number of parameters of each of the number of tests executed by the first communications device via the mobile services carrier network; and
    generating a machine-readable symbol representation, via at least one processor, that encodes in a relative spacing between a plurality of marks and spaces between the marks the stored state information, the stored test result information, and the stored number of parameter values, for each of the number of tests executed by the first communications device via the mobile services carrier network, wherein the generating a machine-readable symbol representation, via at least one processor, includes generating an electronic representation of a two-dimensional machine-readable symbol at the first communications device.

2. The method of claim 1 wherein generating a machine-readable symbol representation includes generating an electronic representation of a two-dimensional machine-readable symbol that is selectively optically displayable via a respective display screen of at least the first communications device.

3. The method of claim 1 wherein generating a machine-readable symbol representation includes generating a visual representation of a two-dimensional machine-readable symbol by a respective display screen of at least the first communications device.

4. The method of claim 1, further comprising:
collecting the state information via a respective processor of the first communications device; and
collecting the test result information via the respective processor of the first communications device.

5. The method of claim 4 wherein the storing of the state information, the storing of the test result information, and the storing of the parameter values is performed via the respective processor of the first communications device.

6. The method of claim 4 wherein the generating a machine-readable symbol representation, via at least one processor includes optically displaying a visual representation of the two-dimensional machine-readable symbol by a display screen of the first communications device.

7. The method of claim 4 wherein the storing of the state information, the storing of the test result information, and the storing of the parameter values are each performed via a processor of a first server, the first server remotely located from at least the first communications device and communicatively coupled therewith.

8. The method of claim 7 wherein the generating a machine-readable symbol representation, via at least one processor includes: generating an electronic representation of a two-dimensional machine-readable symbol at the first server, and further including:
transmitting the electronic representation of the two-dimensional machine-readable symbol from the first server to the first communications device.

9. The method of claim 8 wherein the generating a machine-readable symbol representation, via at least one processor further includes: optically displaying a visual representation of the two-dimensional machine-readable symbol by a display screen of the first communications device.

10. The method of claim 9 further comprising:
optically reading the visual representation from the display screen of the first communications device;
decoding the visual representation to obtain at least a portion of at least one of the following data: the state information, the test result information, and the number of parameter values; and
storing an electronic representation of the decoded data.

11. The method of claim 4 wherein the collecting test result information that represents a respective test result for each of a number of tests executed by the first communications device via the mobile services carrier network includes collecting test results representative of at least one of: content performance, content key performance indicators, user experience, user quality, sensor performance, sensor key performance indicators, a network service performance, a network service availability, a network service key performance indicator, an over-the-top service performance, an over-the-top service availability, or an over-the-top key performance indictor.

12. The method of claim 4 wherein the collecting state information that represents at least one state of at least one of the first communications device or the mobile services carrier network includes: collecting information that represents at least one state of the first communications device with respect to a first test of the number of tests and collecting information that represents at least one state of the mobile services carrier network respect to the first test of the number of tests.

13. The method of claim 1 wherein storing test result information that represents a respective test result for each of a number of tests executed by the first communications device via the mobile services carrier network includes storing test results representative of at least one of: content performance, content key performance indicators, user experience, user quality, sensor performance, sensor key performance indicators, a network service performance, a network service availability, a network service key performance indicator, an over-the-top service performance, an over-the-top service availability, or an over-the-top key performance indicator.

14. The method of claim 1 wherein the encoding further includes encoding condition data into the machine-readable symbol, wherein the condition data is related to conditions of at least one of the network or the content server and wherein the condition data includes at least one of: content availability, environmental data, time, date, and power measurements.

15. The method of claim 1 wherein generating a machine-readable symbol representation includes generating at least one of: a linear barcode representation or a two-dimensional or quick response (QR) code representation.

16. A first communications device that tests mobile services provided via a mobile services carrier network, the device comprising:
non-transitory computer readable media that stores:
state information that represents at least one state of at least one of the first communications device or the mobile services carrier network;
test result information that represents a respective test result for each of a number of tests executed by the first communications device via the mobile services carrier network; and
a number of parameter values that represent parameter values for a number of parameters of each of the number of tests executed by the first communications device via the mobile services carrier network; and
a data encoder that generates a machine-readable symbol representation that encodes in a relative spacing between a plurality of marks and spaces between the marks the stored state information, the stored test result information, and the stored number of parameter values, for each of the number of tests executed by the first communications device via the mobile services carrier network, wherein the data encoder further generates an electronic representation of the machine-readable symbol representation as a two-dimensional machine-readable symbol.

17. The first communications device of claim 16 wherein the machine-readable symbol representation includes an electronic representation of a two-dimensional machine-readable symbol.

18. The first communications device of claim 16 further comprising:

a display screen that renders a visual representation of the machine-readable symbol representation as a two-dimensional machine-readable symbol.

19. The first communications device of claim 16, further comprising:
a data collection component that collects the state information and the test result information.

20. The first communications device of claim 19 wherein the state information, the test result information, and the parameter values stored on the non-transitory computer readable media is collected by the data collection component.

21. The first communications device of claim 19, further comprising:
a display screen that optically displays a visual representation of the two-dimensional machine-readable symbol.

22. The first communications device of claim 19 further comprising:
a communications interface that transmits at least some of the state information, the test result information, and the parameter values to a server remotely located from at least the first communications device and communicatively coupled therewith.

23. The first communications device of claim 22 wherein the communications interface further receives an electronic representation of a two-dimensional machine-readable symbol from the server.

24. The first communications device of claim 23 further comprising:
a display screen that optically displays a visual representation of the two-dimensional machine-readable symbol.

25. The method of claim 24 wherein the visual representation is optically read and decoded by a test apparatus, and wherein an electronic representation of the decoded visual representation is stored on a server.

26. The first communications device of claim 19 wherein the test result information that represents a respective test result for each of a number of tests executed by the first communications device via the mobile services carrier network includes test results representative of at least one of: content performance, content key performance indicators, user experience, user quality, sensor performance, sensor key performance indicators, a network service performance, a network service availability, a network service key performance indicator, an over-the-top service performance, an over-the-top service availability, or an over-the-top key performance indictor.

27. The first communications device of claim 19 wherein the state information that represents at least one state of at least one of the first communications device or the mobile services carrier network includes: information that represents at least one state of the first communications device with respect to a first test of the number of tests and information that represents at least one state of the mobile services carrier network respect to the first test of the number of tests.

28. The first communications device of claim 16 wherein the test result information that represents a respective test result for each of a number of tests executed by the first communications device via the mobile services carrier network includes test results representative of at least one of: content performance, content key performance indicators, user experience, user quality, sensor performance, sensor key performance indicators, a network service performance, a network service availability, a network service key performance indicator, an over-the-top service performance, an over-the-top service availability, or an over-the-top key performance indictor.

29. The first communications device of claim 16 wherein the data encoder further encodes condition data into the machine-readable symbol, wherein the condition data is related to conditions of at least one of the network or the content server, and wherein the condition data includes at least one of: content availability, environmental data, time, date, and power measurements.

30. The first communications device of claim 16 herein the machine-readable symbol representation includes at least one of: a linear barcode representation or a two-dimensional or quick response (QR) code representation.

* * * * *

UNITED STATES PATENT AND TRADEMARK OFFICE
CERTIFICATE OF CORRECTION

PATENT NO.         : 9,686,026 B1
APPLICATION NO.    : 15/427946
DATED              : June 20, 2017
INVENTOR(S)        : David K. Reed et al.

It is certified that error appears in the above-identified patent and that said Letters Patent is hereby corrected as shown below:

In the Claims

Column 20, Line 3:
"performance indictor." should read, --performance indicator.--.

Column 20, Line 11:
"mobile service carrier network respect to the first test of the" should read, --mobile service carrier network with respect to the first test of the--.

Column 22, Line 8:
"performance indictor." should read, --performance indicator.--.

Column 22, Line 16:
"services carrier network respect to the first test of the number" should read, --services carrier network with respect to the first test of the number--.

Column 22, Line 29:
"performance indictor." should read, --performance indicator.--.

Signed and Sealed this
Twelfth Day of September, 2017

Joseph Matal
*Performing the Functions and Duties of the
Under Secretary of Commerce for Intellectual Property and
Director of the United States Patent and Trademark Office*